(12) United States Patent
Jones et al.

(10) Patent No.: US 12,448,559 B1
(45) Date of Patent: Oct. 21, 2025

(54) PUDDLE JOB WITH DELAYED SETTING OF RESIN VIA A POLYMERIZATION REACTION WITH AN ACTIVATOR

(71) Applicant: Halliburton Energy Services, Inc., Houston, TX (US)

(72) Inventors: Paul J. Jones, Houston, TX (US); Ernst Rudolf Man Schnell, Houston, TX (US); Lonnie Carl Helms, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/735,404

(22) Filed: Jun. 6, 2024

(51) Int. Cl.
*E21B 33/05* (2006.01)
*C09K 8/44* (2006.01)
*E21B 43/16* (2006.01)

(52) U.S. Cl.
CPC ............. *C09K 8/44* (2013.01); *E21B 33/05* (2013.01); *E21B 43/16* (2013.01)

(58) Field of Classification Search
CPC . C09K 8/44; E21B 43/16; E21B 33/02; E21B 33/05
See application file for complete search history.

(56) References Cited

U.S. PATENT DOCUMENTS

| | | | |
|---|---|---|---|
| 4,917,188 A | 4/1990 | Fitzpatrick, Jr. | |
| 5,295,541 A | 3/1994 | Ng et al. | |
| 9,617,830 B2 | 4/2017 | Minassa et al. | |
| 10,072,479 B2 | 9/2018 | Felten et al. | |
| 11,982,149 B2 | 5/2024 | Burguieres | |
| 2016/0272872 A1* | 9/2016 | Vo | C09K 8/56 |
| 2016/0318710 A1 | 11/2016 | Williams et al. | |
| 2017/0081943 A1* | 3/2017 | Hansen | E21B 33/13 |
| 2017/0226405 A1* | 8/2017 | Weaver, Jr. | E21B 43/20 |
| 2017/0259977 A1 | 9/2017 | Hall et al. | |
| 2018/0215988 A1* | 8/2018 | Gamwell | C04B 28/02 |
| 2020/0362222 A1* | 11/2020 | Jones | C04B 24/023 |
| 2021/0363401 A1* | 11/2021 | Jones | C09K 8/44 |
| 2023/0313636 A1 | 10/2023 | El Nekhily et al. | |

* cited by examiner

*Primary Examiner* — Silvana C Runyan
(74) *Attorney, Agent, or Firm* — Sheri Higgins Law, PLLC; Sheri Higgins (57) ABSTRACT

A puddle job can be performed in a wellbore to secure a liner within an open-hole wellbore. A resin in liquid form can be spotted at the bottom of the wellbore. The liner can be lowered into the wellbore to displace the resin up into an annulus between the outside of the liner and the wellbore wall. The resin can be contacted with a solid or liquid activator to cause the resin to set. The activator can cause the resin to set via a polymerization reaction such as ROMP, FRP, or step polymerization. The resin can be contacted with the activator as the liner is being lowered or afterwards. The resin/activator can be used instead of a cement composition.

20 Claims, 2 Drawing Sheets

PUDDLE JOB WITH DELAYED SETTING OF RESIN VIA A POLYMERIZATION REACTION WITH AN ACTIVATOR

TECHNICAL FIELD

The field relates to a puddle job for oil or gas operations using a settable resin instead of cement. The resin can set when contacted with an activator. The contact with the activator can be delayed.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Oil and gas hydrocarbons are naturally occurring in some subterranean formations. In the oil and gas industry, a subterranean formation containing oil and/or gas is referred to as a reservoir. A reservoir can be located under land or offshore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and at a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a subterranean formation" means and includes into any portion of the well, including into the wellbore, into the near-wellbore region via the wellbore, or into the subterranean formation via the wellbore.

A wellbore is formed using a drill bit. A drill string can be used to aid the drill bit in drilling into the subterranean formation to form the wellbore. The drill string can include a drilling pipe. During drilling operations, a drilling fluid, sometimes referred to as a drilling mud, may be circulated downwardly through the drilling pipe, and back up an annulus between the wellbore and the outside of the drilling pipe. The drilling fluid performs various functions, such as cooling the drill bit, maintaining the desired pressure in the well, and carrying drill cuttings upwardly through the annulus between the wall of the wellbore and the drilling pipe.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include but are not limited to the space between the wall of a wellbore and the outside of a tubing string in an open-hole wellbore; the space between the wall of the wellbore and the outside of a casing in a cased-hole wellbore; and the space between the inside of a casing and the outside of a tubing string in a cased-hole wellbore.

Figure 1:
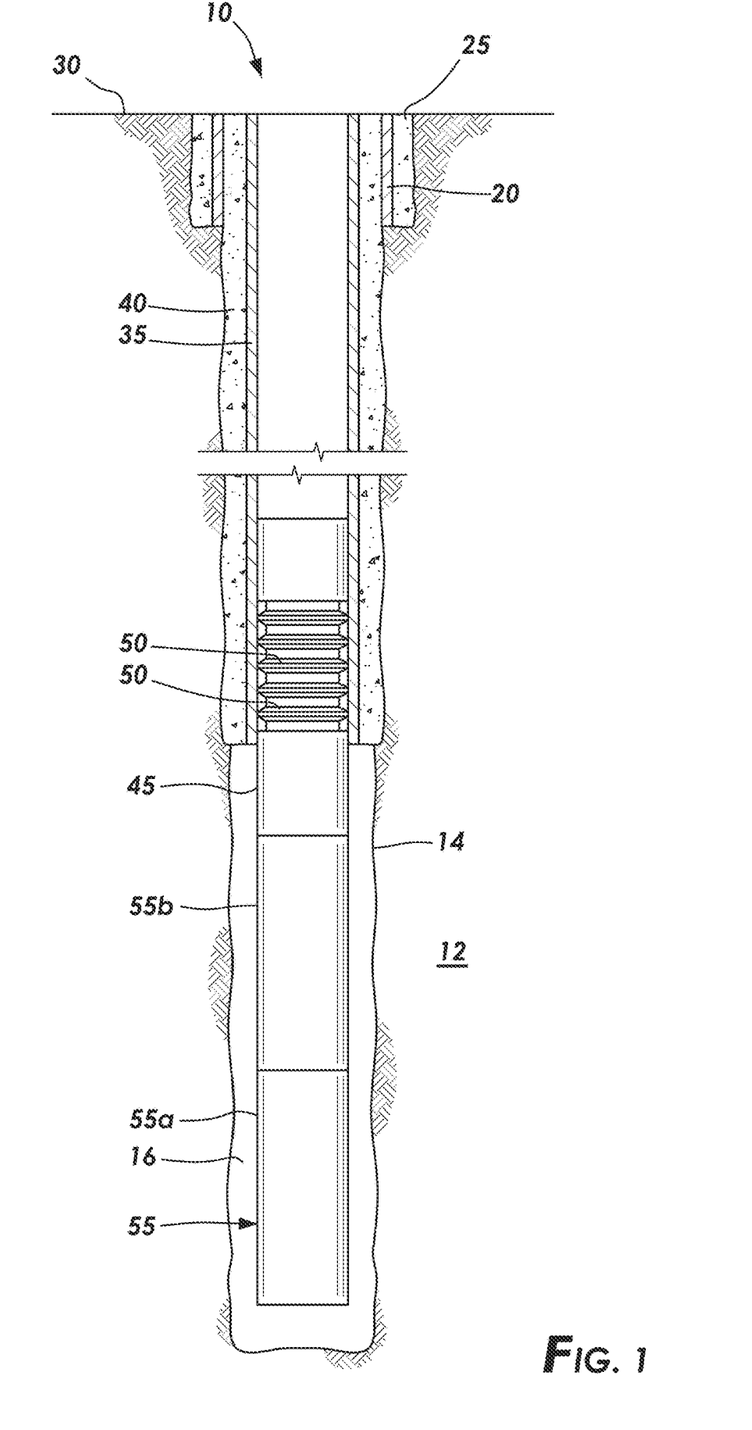
FIG. 1 is a schematic illustration showing a wellbore having a surface casing and a liner suspended from the surface casing via a liner hanger according to certain embodiments.

FIG. 1 shows an example of a wellbore 10 having casing and a liner hanger 45 and joints of liner 55. The wellbore 10 can penetrate a subterranean formation 12 and has a wellbore wall 14. Surface casing 20 can extend from the surface 30 into the wellbore 10 down to a desired depth. Multiple joints of surface casing 20 joined together can be used. A pipe joint, for example a liner joint, is a section of pipe connected to the next section or joint by a union or connector. A cement sheath 25 can anchor the surface casing 20 in the wellbore 10. Optionally, an intermediate casing 35 can be deployed concentrically within the surface casing 20. The intermediate casing 35, when used, can be held in place within the surface casing 20 with an intermediate cement sheath 40. Multiple joints of intermediate casings 35 can be used. A liner hanger 45 can be deployed within the intermediate casing 35 or within the surface casing 20 if intermediate casing is not used. The liner hanger 45 can suspend a liner 55 from its end. Multiple joints of liner 55 can be run into the wellbore 10. An annulus 16 can be located between the outside of the liner 55 and the inside of the wellbore wall 14. The liner hanger 45 can be anchored to the intermediate casing 35 or surface casing 20 and can include one or more sealing elements 50 that form an integral part of the liner hanger 45 or can sit on top of the liner hanger 45 as a standalone liner-top packer. The sealing elements 50 can seal an annulus located between the outside of an inner intermediate casing and the inside of the adjacent intermediate casing. The seal can inhibit or prevent wellbore fluids from bypassing the liner 55 and liner hanger 45.

During well completion, it is common to introduce a cement composition into the annulus 16 in order to cement the liner 55 in the wellbore 10. By cementing the liner 55 in the wellbore 10, fluids are prevented from flowing into the annulus 16. Consequently, oil, gas, or water can be produced in a controlled manner by directing the flow of formation fluids through the liner 55 and casing 20/35 and into the wellhead. Liner cementing generally involves pumping a cement composition through the surface casing, liner hanger, and the liner out the bottom of the liner and up into the annulus. During the cementing operation, the cement is pumped through tight clearances, for example, in the liner hanger, a float shoe, or float equipment. Pumping pressure may need to be increased to force the cement past these tight clearances. However, there is a risk that the equivalent circulating density (ECD) increases to such an extent that one or more joints of the liner can collapse and/or there is an increased risk that the cement fractures the subterranean formation. If fracturing occurs, then some of the cement can be lost into the formation instead of remaining in the annulus, which causes an incomplete cementing job.

To overcome these risks, a puddle job can be performed instead in vertical wellbores. A puddle job typically involves one of 2 different operations. One is to run a smaller string into the wellbore to pump the cement into the bottom of the wellbore, pull the smaller string from the wellbore, and then run the last joints of liner into the wellbore. Another is to run all but the last joint of liner into the wellbore, then pump cement into the wellbore, and then run the last joint of liner into the wellbore. When the last liner joint(s) are run into the wellbore, the bottommost joint contacts and displaces the puddle of cement residing at the bottom of the wellbore. As used herein, the term "bottom" and all grammatical variations thereof means at a location farthest from the wellhead. The bottommost joint of liner can include float equipment or valves that prevent the cement from entering the inside of the liner; and therefore, forces the cement up into the annulus on the outside of the liner.

As used herein, a "cement composition" is a mixture of at least cement and water. A cement composition can include additives. As used herein, the term "cement" means an initially dry substance that develops compressive strength or sets in the presence of water. Some examples of cements include, but are not limited to, Portland cements, pozzolanic cements, gypsum cements, high alumina content cements, slag cements, high magnesia content cements, sorel cements, and combinations thereof. A cement composition is a heterogeneous fluid including water as the continuous phase of the slurry and the cement (and any other insoluble particles) as the dispersed phase.

A cement composition will develop gel strength and have an initial setting time and a setting time. A "gel" refers to a substance that does not easily flow and in which shearing stresses below a certain finite value fail to produce permanent deformation. The higher the gel strength, the more shear stress is required to move the gel. The compressive strength of a cement composition can be used to indicate whether the cement composition has initially set or set. As used herein, a cement composition is considered "initially set" when the cement composition develops a compressive strength of 50 psi (0.3 MPa) using the non-destructive compressive strength method at a temperature of 212° F. (100° C.) and a pressure of 3,000 psi (20 MPa). As used herein, the "initial setting time" is the difference in time between when the cement and any other ingredients are added to the water and when the composition is initially set. As used herein, the term "set," and all grammatical variations thereof, are intended to mean the process of becoming hard or solid. As used herein, the "setting time" is the difference in time between when the cement and any other ingredients are added to the water and when the composition has set at a specified temperature.

However, there are several disadvantages to cementing puddle jobs. If the cement develops a high enough gel strength or initially sets before the bottommost joint of liner is run into the wellbore, then the liner may not be capable of displacing some or all of the cement up into the annulus in order to cement the liner in the wellbore. In order to overcome these risks, operators must work very quickly to run in the liner into the wellbore after the cement has been pumped or additives, such as set retarders, must be added to the cement before the cement is pumped in order to delay the gelation and initial setting time. However, operators may not be fast enough, or the additives may not be sufficient to allow the cement to be displaced up into the annulus to properly cement the liner in the wellbore. Accordingly, there exists a need for securing the liner in a wellbore that overcomes all of these problems.

It has been discovered that a settable resin can be used instead of cement in a puddle job. The resin is a liquid until contacted with an activator. The activator causes the resin to set. Prior to contact, the fluid properties of the resin remain mostly the same and no gelation or setting occurs. Contact with the activator can be delayed, wherein the resin is in liquid form until contacted with the activator and no gelling of the resin occurs.

According to any of the embodiments, a wellbore system can include: a liner installed within the wellbore, wherein the liner comprises at least a first joint and a second joint; an activator; and a resin located within the wellbore, wherein the resin is in liquid form prior to being contacted with the activator, wherein the first joint of liner displaces some or all of the resin up into at least a portion of an annulus located between a wellbore wall and an outside of the liner, and wherein the activator causes the resin to set via a polymerization reaction.

Figure 2A:
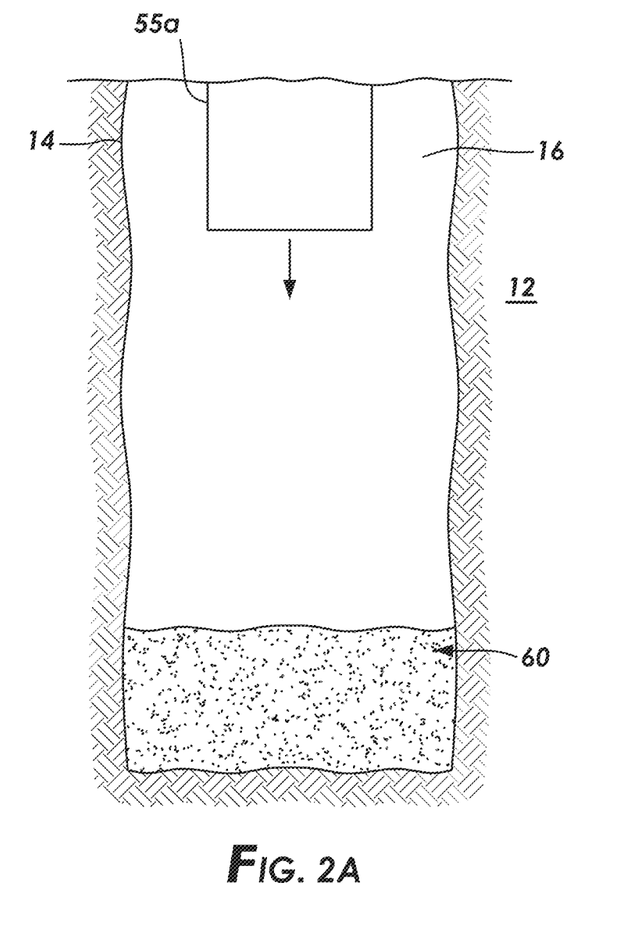
FIG. 2A is a schematic illustration showing a puddle of a settable resin at the bottom of the wellbore and the liner before being lowered into the puddle according to certain embodiments.

With reference to FIGS. 1 and 2A, which show a schematic illustration of a wellbore penetrating a subterranean formation 12 and having a wellbore wall 14. A liner 55 can include at least a first joint of liner 55a and a second joint of liner 55b. The liner 55 can include multiple other joints located between the first and second joints of the liner. The liner 55 can be suspended from a surface casing 20 or an intermediate casing 35 via a liner hanger 45. The second joint of liner 55b can be joined to the first joint of liner 55a such that the first joint of liner 55a is farther away from the wellhead than the second joint of liner 55b.

Figure 2B:
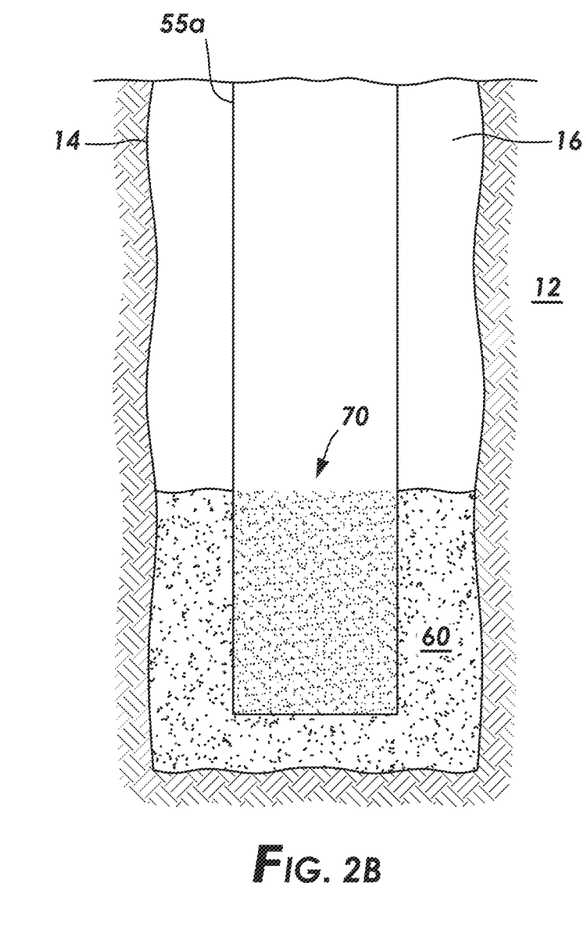
FIG. 2B is a schematic illustration of FIG. 2A showing displacement of the puddle of resin by the liner into an annulus of the wellbore according to certain embodiments.

As can be seen in FIGS. 2A and 2B, the resin 60 is located within the wellbore 10. The resin can be located at the bottom of the wellbore and can referred to as a puddle of resin. The resin 60 is a settable resin. The resin can remain as a liquid until it is contacted with the activator 70. As used herein, the term "resin" means any settable resin and includes resin monomers that set via a polymerization reaction without the need to refer to resin monomers throughout. The resin 60 in liquid form can be introduced into the wellbore, for example by pumping, through the liner 55, or a separate tubing string, drill pipe, or coiled tubing (not shown) can be run into the liner and the resin can be introduced into the wellbore via the tubing string. If using a tubing string, drill pipe, or coiled tubing to introduce the resin into the wellbore, then the tubing string, drill pipe, or coiled tubing can be removed from the wellbore after introducing the resin.

As can be seen in FIG. 2B, after the resin 60 has been introduced, a second joint of liner 55b can be installed in the wellbore 10. The second joint of liner 55b will be located above the first joint of liner 55a and all liner 55 joints will be moved down within the wellbore. The first joint of liner 55a displaces some or all of the resin 60 in liquid form up into at least a portion of the annulus 16 located between the wellbore wall 14 and the outside of the liner 55, for example the first and second joints of liner 55a/55b and any additional intermediate liner joints. The first joint of liner 55a can include a fluid restrictor, for example a valve or float equipment or collar, that prevents the resin 60 from entering the inside of the liner 55 during displacement of the resin 60 into the annulus 16. According to any of the embodiments, the resin 60 is displaced completely into the entirety of the annulus 16. According to any of the embodiments, a cement composition is not introduced into the wellbore to secure the liner within the wellbore, and the resin 60 and activator 70 are used instead of cement.

The activator causes the resin to set. The activator can cause the resin to set when the resin comes in contact with the activator. The contact can occur either during displacement or after the resin has been displaced into the annulus. The activator can cause the resin to set via a polymerization reaction. A polymer is a large molecule composed of repeating units, typically connected by covalent chemical bonds. A polymer is formed from monomers. During the formation of the polymer during the polymerization reaction, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various ways along the polymer chain. For example, the repeating units can be random, alternating, periodic, or block. The conditions of the polymerization reaction can be adjusted to help control the average number of repeating units (the average chain length) of the polymer. As used herein, a "polymer" can include a cross-linked polymer. As used herein, a "cross link" or "cross linking" is a connection between two polymer molecules. A cross-link between two polymer molecules can be formed by a direct interaction between the polymer molecules, or conventionally, by using a cross-linking agent that reacts with the polymer molecules to link the polymer molecules.

A polymer has an average molecular weight, which is directly related to the average chain length of the polymer. The average molecular weight of a polymer has an impact on some of the physical characteristics of a polymer, for example, its solubility and its dispersibility. For a copolymer, each of the monomers will be repeated a certain number of times (number of repeating units). The average molecular weight for a copolymer can be expressed as follows:

$$\text{Avg. molecular weight} = (M \cdot W \cdot m_1 * RU\, m_1) + (M \cdot W \cdot m_2 * RU\, m_2) \ldots$$

where M.W.$m_1$ is the molecular weight of the first monomer; RU $m_1$ is the number of repeating units of the first monomer; M.W.$m_2$ is the molecular weight of the second monomer; and RU $m_2$ is the number of repeating units of the second monomer. Of course, a terpolymer would include three monomers, a tetra polymer would include four monomers, and so on.

According to any of the embodiments, the polymerization reaction is ring-opening metathesis polymerization (ROMP). According to these embodiments, the activator can be called a catalyst. According to these embodiments, the resin can be a cyclic olefin. The cyclic olefin resin includes a carbon ring with two double bonds (diene). Examples of cyclic olefins include but are not limited to cyclobutadiene, cyclopentadiene, dicyclopentadiene, tricyclopentadiene, cyclohexadiene, cycloheptadiene, cyclooctadiene, cyclooctatetraene, dicyclopentadiene, norbornene, terpinene, isomers thereof, and combinations thereof. Ring-opening metathesis polymerization (ROMP) is a polymerization process that is best accomplished by Schrock-type carbenes; that is, high-oxidation-state transition-metal alkylidenes in which the cyclic olefins, whether mono-, bi-, or multi-cyclic, undergo ring opening and are concomitantly joined together to form a polymer chain. ROMP is thus a chain-growth polymerization reaction. The mechanism is based on olefin metathesis, and the ring-opening process occurs at the most stable site of the monomer (resin), that is, at the double bond. The driving force of the reaction is relief of ring strain in the cyclic olefin monomers. When the activator, which can also be called a catalyst, contacts or mixes with the resin, the activator opens the ring and causes the chain-growth polymerization reaction to occur. Resin molecules that undergo ROMP may polymerize by forming new carbon-carbon bonds between molecules. Once the polymerization reaction is initiated, the reaction may proceed rapidly to transform the resin from a liquid to a solid.

The activator/catalyst for ROMP of the resin can be a transition metal catalyst. The transition metal can be selected from the group consisting of ruthenium, osmium, molybdenum, and any combinations thereof. The activator can be a transition metal compound catalyst where the transition metal compound catalyst may include a substituted or unsubstituted metal carbene compound comprising a transition metal and an organic backbone. Some non-limiting examples of the transition metal compound catalyst include a Grubbs Catalyst® and Schrock catalysts. The Grubbs Catalyst® can include ruthenium alkylidene or osmium alkylidene and the Schrock catalyst can include molybdenum. According to any of the embodiments, the resulting polymer has a molecular weight greater than 1,000,000 Daltons.

According to any of the embodiments, the polymerization reaction is free-radical polymerization (FRP), and the activator can be called an initiator. FRP is a method of polymerization by which a polymer forms by the successive addition of free-radical building blocks (the repeat units). Free radicals can be formed by a number of different mechanisms, usually involving separate initiator molecules. Following the free-radical generation, the initiating free radical adds nonradical monomer units, thereby growing the polymer chain. Initiation is the first step of the polymerization process. During initiation, an active center is created from which a polymer chain is generated. Radical initiation works best on the carbon-carbon double bond of vinyl monomers and the carbon-oxygen double bond in aldehydes and ketones. Initiation has two steps in which in the first step, one or two radicals are created from the molecules of the activator. In the second step, the radicals that were created are then transferred from the activator molecules to the monomer units present in the resin.

The resin for FRP can be a compound containing vinyl groups. The vinyl-containing compound can be selected from the group consisting of n-vinyl-imidazol, n-vinyl-caprolactam, n-vinyl-pyrrolidone, vinyl methyl oxazolidinone, n-vinyl-n-methylacetamide, ethyl vinyl ether, isobutyl vinyl ether, cyclohexyl vinyl ether, dodecyl vinyl ether, octadecyl vinyl ether, 1,4-butanediol divinyl ether, diethyleneglycol divinyl ether, triethyleneglycol divinyl ether, 1,4-cyclohexanedimethanol divinyl ether, hydroxybutyl vinyl ether, acrylonitrile, methyl methacrylate, styrene, butadiene, propylene, vinyl ester resin, vinyl acetate, vinyl propionate, vinyl laurate, and combinations thereof. Vinyl ester resin is produced by the esterification of an epoxy resin with acrylic or methacrylic acids. The "vinyl" groups refer to these ester substituents, which are prone to polymerize and readily do so when contacted with the initiator.

There are different types of initiation and initiators that can be used in FRP. One is thermal decomposition in which the initiator is heated until a bond is homolytically cleaved, producing two radicals. The bottomhole temperature of the wellbore can heat the initiator until the radicals are produced. As used herein, the term "bottomhole" means the location in the wellbore where the resin and activator are located. The initiator for thermal decomposition can be selected from organic peroxides or azo compounds.

Examples of organic peroxides include but are not limited to acetone peroxide, acetozone, alkenyl peroxides, arachidonic acid 5-hydroperoxide, artelinic acid, artemether, artemisinin, artemotil, arterolane, artesunate, ascaridole, benzoyl peroxide, bis(trifluoromethyl)peroxide, bis(trimethylsilyl)peroxide, tert-butyl peroxybenzoate, CSPD (molecule), di-tert-butyl peroxide, diacetyl peroxide, dicumyl peroxide, diethyl ether peroxide, difluorodioxirane, dihydroartemisinin, 1,1'-Dihydroxydicyclohexyl peroxide, dilauroyl peroxide, dimesityldioxirane, dimethyldioxirane, 1,2-Dioxane, 1,2-Dioxetane, 1,2-Dioxetanedione, 1,2-Dioxolane, dipropyl peroxydicarbonate, ergosterol peroxide, hexamethylene triperoxide diamine, hydroperoxide, methyl ethyl ketone peroxide, nardosinone, paramenthane hydroperoxide, perfosfamide, peroxyacetyl nitrate, or peroxyacyl nitrates. The organic peroxide can be selected based on the activation temperature of the peroxide and the anticipated bottomhole temperature of the wellbore.

Examples of azo compounds include but are not limited to 1,1'-Azobis(cyclohexanecarbonitrile) "ABCN," azobenzene, P-azobenzenearsonate, 1,1'-Azobis-1,2,3-triazole, 2,2'-Azobis(2-amidinopropane) dihydrochloride, 4,4'-Azobis(4-cyanopentanoic acid), azobisisobutyronitrile, azodicarbonamide, azomethane, azoxy compounds, para-azoxyanisole, azoxybenzene, balsalazide, calmagite, diethyl azodicarboxylate, diimide, diisopropyl azodicarboxylate, 4,4'-Dinitro-3,3'-diazenofuroxan, 1,3-Diphenyltriazene, fazadinium bromide, glycoazodyes, methylazoxymethanol, methylazoxymethanol acetate, phenazopyridine, 3-Phenylazoacetylacetone, or potassium azodicarboxylate. The azo compounds can be selected based on the activation temperature of the azo compounds and the anticipated bottomhole temperature of the wellbore.

Redox reactions or persulfates can also be used for FRP.

The generated radicals from the initiator cause polymerization of the resin into a linear, cross-linked, or branched polymer. Functional groups of the resin, for example vinyl groups, can react with each other to form the polymer. A singular vinyl group will form a linear polymer; whereas multiple vinyl groups will form a cross-linked or cross-linked and branched polymer. A cross-linked system is preferred because linear polymers may melt and flow and thus not remain in solid form, while cross-linked systems undergo a glass transition that allows them to remain a solid. Accordingly, the resin monomer can include more than one functional group whereby a cross-linked or cross-linked and branched polymer is formed. According to any of the embodiments, the resulting polymer can have a molecular weight greater than 1,000,000 Daltons.

According to any of the embodiments, the polymerization reaction is step polymerization, and the activator is a second reactive monomer. According to these embodiments, the resin is an epoxy resin. Epoxy resins, also known as polyepoxides, are a class of reactive prepolymers and polymers which contain epoxide groups. Epoxy resins can be reacted (that is, cross-linked) with the second reactive monomer (co-reactant). These co-reactants are often referred to as hardeners, and the cross-linking reaction is commonly referred to as curing. Reaction of polyepoxides with polyfunctional hardeners forms a thermosetting polymer, often with strong mechanical properties as well as high temperature and chemical resistance. According to any of the embodiments, the epoxy resin comprises a diglycidyl ether functionalized molecule or any multifunctional glycidyl ether molecule. The diglycidyl ether molecule can be selected from the group consisting of a diglycidyl ether of bisphenol A, optionally blended with butyl glycidyl ether, cyclohexane dimethanol diglycidyl ether, and any combination thereof. In an embodiment, the epoxy resin comprises a novolac epoxy resin. In some embodiments, a solvent or diluent, such as cyclohexane dimethanol diglycidyl ether, can be added to the resin to reduce its viscosity for ease of handling, mixing, transferring, or pumping.

Common classes of co-reactant hardeners for epoxy resins include but are not limited to amines, acids, acid anhydrides, phenols, alcohols, and thiols. The co-reactant hardener can be selected from the group consisting of aliphatic amines, aliphatic tertiary amines, aromatic amines, cycloaliphatic amines, heterocyclic amines, amido amines, polyamides, polyethyl amines, polyether amines, polyoxyalkylene amines, diethyltoluene diamine, carboxylic anhydrides, carboxylic acids, triethylenetetraamine, ethylene diamine, N-cocoalkyltrimethylene, isophorone diamine, N-aminophenyl pipera-zine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof. The reaction time between the resin and the co-reactant hardener can be controlled by using an accelerator or lower reactive co-reactant hardeners to provide a desired setting time. By way of example, the reaction time can be accelerated by using 2,4,6 trimethyl aminomethyl phenol. Some hardeners are slower to react with the resin monomers, which can delay the polymerization and thus the setting time. By way of example, 6-methyl-2,4-bis(methylthio) phenylene- 1,3-diamine; or 2-methyl-4,6-bis(methylthio) phenylene-1,3-diamine are slower to react than other hardeners. The accelerator can be added to the liquid resin during introduction into the wellbore or it can be added to the activator.

The activator can cause polymerization of the resin, which causes the liquid resin to set. The resin will remain a liquid until it is contacted with the activator. One of the many advantages of using the settable resin and activator instead of a cement composition is that the resin remains in liquid form until contacted with the activator. This allows the resin to remain in liquid form during placement of the puddle of resin into the wellbore, and as the liner displaces the liquid resin up into the annulus.

The set resin can have desirable properties. The set resin can have different properties than that of a cement composition. According to any of the embodiments, the set resin can have a lower permeability, higher strain to failure ratios, and a higher compressive strength compared to a cement composition. According to any of the embodiments, the set resin possesses mechanical properties such that the set resin withstands the bottomhole temperature and pressure without failing. As used herein, "failing" means an undesirable loss of structural integrity that causes the set resin to no longer provide the intended function (e.g., cracks in the set resin occur that undesirably allow fluid to flow through the set resin, or thermal degradation or hydrolysis causes the set resin to revert to small molecules, which diffuse from the intended location in the annulus). Unlike a set cement composition that generally has a continuous increase of stress versus strain until it reaches mechanical failure, the set resin is very unlikely to fail because it can tolerate much higher strain rates. The resin can go through a mechanical yield point and then the stress goes down as displacement increases.

The set resin can have a Young's modulus in a range of 1 to 3,000 megapascals (MPa). The Young's modulus of a material is the measure of the ability of a material to withstand changes in length when under lengthwise tension or compression. Sometimes referred to as the modulus of elasticity, Young's modulus is equal to the longitudinal stress divided by the strain. Young's modulus is expressed in units of pressure, for example, Pa (Pascals) or pounds force per square inch (psi). Young's modulus can be calculated as the stress to strain ratio along an axis of a compressive strength graph in the region where the Hook's law is applicable.

The setting time of the resin can be in a range, for example from 10 minutes to 1 month, from when the resin is contacted with the activator. In this manner, the viscosity of the resin/activator mixture can gradually increase so the mixture is still in a fluid form to ensure the mixture is fully displaced at the desired location within the annulus before becoming completely set. This significant advantage may not be possible when using a cement composition or only possible when cement set retarders are added to the cement. This is because a cement composition is mixed at the surface and pumped downhole. The liner is then run in hole and displaces the cement, which must be done before the cement develops gel strength resisting movement. Whereas the resin remains in a liquid form until it is contacted with the activator. This advantageously delays the setting of the resin at least until after the resin has been introduced into the wellbore and possibly until after the resin has been displaced by the liner. The setting time of the resin can be dependent on the bottomhole temperature of the wellbore the resin crosses its glass transition temperature. By way of example, a bottomhole temperature of 300° F. (148.9° C.) can cause the setting time of the resin to be less than a bottomhole temperature of 200° F. (93.3° C.).

As discussed above, contact with the activator causes the resin to set. The contact is considered delayed because the resin is not contacted with the activator until the resin has already been placed downhole and optionally already displaced into the annulus. According to any of the embodiments, the activator is in a solid, particle form. A liquid activator can be turned into a solid powder, for example by encapsulating the liquid activator. A liquid activator can also be infiltrated into a porous media, such as porous silica particles (referred to as LIPS). The liquid activator will remain within the pores of the media until encountering another liquid (e.g., the liquid resin) whereby the liquid activator will move out of the pores and mix with the other liquid. The activator particles or the porous media can have a mean particle size in a range of 100 nm to 500 micrometers. Alternatively, the mean particle size can be in the range of 100 nm to about 500 nm, 500 nm to 1 micrometer, 1 micrometer to 100 micrometers, 100 micrometers to 250 micrometers, or 250 micrometers to 500 micrometers.

The activator particles or the porous media can be coated onto at least a portion of the outside of one or more of the liner joints. Coating more than one liner joint can advantageously be used when the activator contacts the liquid resin as the liner is being lowered and displaces the resin into the annulus. By way of example, if the first and second liner joints are coated, then the activator coated on the first liner joint will be the first to contact the resin as the first joint begins to displace the resin up into the annulus, then as the liner joints continue to displace the resin, the activator coated on the second liner joint will contact the resin. This can ensure that a necessary amount of the activator contacts the resin to cause the resin to set. The necessary amount of the activator can be a ratio of activator to resin. The ratio can be, for example, in a range of 1:1 to 1:1,000. Alternatively, it may only be necessary to contact a small volume (e.g., less than 20%) of the total volume of the liquid resin with the activator because once the polymerization reaction has started, the polymerization of the resin can propagate throughout the entire volume of resin without the need for additional activator.

When using solid particles, the contact with the resin can be further delayed by embedding the activator particles in a polymeric shell or wax for example. The polymeric shell or wax can be selected to melt within a desired time at the bottomhole temperature of the wellbore. In this manner, the activator particles will not contact the resin until the polymeric shell or wax has completely melted thus exposing the activator particles. By way of example, a wax can be used that completely melts within 10 minutes at the bottomhole temperature of the wellbore. Accordingly, the liner joints can fully displace the resin into the annulus without contact with the activator particles. Then, once completely melted at the end of 10 minutes, the resin is located within the annulus and the activator can start the polymerization reaction of the resin. When further delaying the contact of the activator with the resin, it may be necessary to coat at least a portion of all of the liner joints that are adjacent to the liquid resin in the annulus. This way, when the polymeric shell or wax melts, the entire column of resin in the annulus will be contacted with the activator.

According to any of the embodiments, the activator is in a liquid form. As discussed above, the liquid activator can be infiltrated into a porous media that is then coated on the outside of the liner joint(s). According to other embodiments, the activator is physically separated from contacting the resin until after the resin has been displaced into the annulus. By way of example, the liquid activator can be stored in a chamber of an injection tool that is located on at least one liner joint. The injection tool can be used to inject the activator into the annulus to contact the resin and cause the resin to set. A desired volume of liquid activator can be injected into the annulus. The desired volume can be a ratio of activator to resin. The ratio can be the same ratio or a different ratio as the activator in solid particle form described above.

An embodiment of the present disclosure is a wellbore system comprising: a liner installed within the wellbore, wherein the liner comprises at least a first joint and a second joint; an activator; and a resin located within the wellbore, wherein the resin is in liquid form prior to being contacted with the activator, wherein the first joint of liner displaces some or all of the resin in liquid form up into at least a portion of an annulus located between a wellbore wall and an outside of the liner, and wherein after contact, the activator causes the resin to set via a polymerization reaction. Optionally, the contact occurs during displacement of the resin or after the resin has been displaced into the annulus. Optionally, the polymerization reaction is ring-opening metathesis polymerization, and the activator is a catalyst. Optionally, the resin is a cyclic olefin. Optionally, the cyclic olefin is selected from the group consisting of cyclobutadiene, cyclopentadiene, dicyclopentadiene, tricyclopentadiene, cyclohexadiene, cycloheptadiene, cyclooctadiene, cyclooctatetraene, dicyclopentadiene, norbornene, terpinene, isomers thereof, and combinations thereof. Optionally, the activator is a transition metal catalyst. Optionally, the transition metal catalyst is selected from the group consisting of ruthenium, osmium, molybdenum, and any combinations thereof. Optionally, the polymerization reaction is free-radical polymerization, and the activator is an initiator. Optionally, the resin is a compound containing vinyl groups. Optionally, the compound containing vinyl groups is selected from the group consisting of n-vinyl-imidazol, n-vinyl-caprolactam, n-vinyl-pyrrolidone, vinyl methyl oxazolidinone, n-vinyl-n-methylacetamide, ethyl vinyl ether, iso-butyl vinyl ether, cyclohexyl vinyl ether, dodecyl vinyl ether, octadecyl vinyl ether, 1,4-butanediol divinyl ether, diethyleneglycol divinyl ether, triethyleneglycol divinyl ether, 1,4-cyclohexanedimethanol divinyl ether, hydroxybutyl vinyl ether, acrylonitrile, methyl methacrylate, styrene, butadiene, propylene, vinyl ester resin, vinyl acetate, vinyl propionate, vinyl laurate, and combinations thereof. Optionally, the initiator is selected from organic peroxides or azo compounds. Optionally, the organic peroxides are selected from the group consisting of acetone peroxide, acetozone, alkenyl peroxides, arachidonic acid 5-hydroperoxide, artelinic acid, artemether, artemisinin, artemotil, arterolane, artesunate, ascaridole, benzoyl peroxide, bis(trifluoromethyl)peroxide, bis(trimethylsilyl)peroxide, tert-butyl peroxybenzoate, CSPD (molecule), di-tert-butyl peroxide, diacetyl peroxide, dicumyl peroxide, diethyl ether peroxide, difluorodioxirane, dihydroartemisinin, 1,1'-Dihydroxydicyclohexyl peroxide, dilauroyl peroxide, dimesityldioxirane, dimethyldioxirane, 1,2-Dioxane, 1,2-Dioxetane, 1,2-Dioxetanedione, 1,2-Dioxolane, dipropyl peroxydicarbonate, ergosterol peroxide, hexamethylene triperoxide diamine, hydroperoxide, methyl ethyl ketone peroxide, nardosinone, paramenthane hydroperoxide, perfosfamide, peroxyacetyl nitrate, peroxyacyl nitrates, and combinations thereof. Optionally, the azo compounds are selected from the group consisting of 1,1'-Azobis(cyclohexanecarbonitrile), azobenzene, P-azobenzenearsonate, 1,1'-Azobis-1,2,3-triazole, 2,2'-Azobis(2-amidinopropane) dihydrochloride, 4,4'-Azobis(4-cyanopentanoic acid), azobisisobutyronitrile, azodicarbonamide, azomethane, azoxy compounds, para-azoxyanisole, azoxybenzene, balsalazide, calmagite, diethyl azodicarboxylate, diimide, diisopropyl azodicarboxylate, 4,4'-Dinitro-3,3'-diazenofuroxan, 1,3-Diphenyltriazene, fazadinium bromide, glycoazodyes, methylazoxymethanol, methylazoxymethanol acetate, phenazopyridine, 3-Phenylazoacetylacetone, potassium azodicarboxylate, and combinations thereof. Optionally, the polymerization reaction is step polymerization, and the activator is a second reactive monomer. Optionally, the resin is an epoxy resin, and wherein the epoxy resin comprises a diglycidyl ether functionalized molecule or a multifunctional glycidyl ether molecule. Optionally, the diglycidyl ether functionalized molecule is selected from the group consisting of a diglycidyl ether of bisphenol A, cyclohexane dimethanol diglycidyl ether, and combinations thereof. Optionally, the second reactive monomer is selected from the group consisting of amines, acids, acid anhydrides, phenols, alcohols, thiols, aliphatic amines, aliphatic tertiary amines, aromatic amines, cycloaliphatic amines, heterocyclic amines, amido amines, polyamides, polyethyl amines, polyether amines, polyoxyalkylene amines, diethyltoluene diamine, carboxylic anhydrides, carboxylic acids, triethylenetetraamine, ethylene diamine, N-cocoalkyltrimethylene, isophorone diamine, N-aminophenyl pipera-zine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof. Optionally, a ratio of activator to resin is in a range of 1:1 to 1:1,000. Optionally, the activator is in a solid form, and wherein the activator is coated onto an outside of the liner. Optionally, the activator is in liquid form, and wherein the activator is physically separated from contacting the resin until after the resin has been displaced into the annulus.

Therefore, the apparatus, methods, and systems of the present disclosure are well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present disclosure.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more liner joints, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A wellbore system comprising:
   a liner installed within the wellbore, wherein the liner comprises at least a first joint and a second joint;
   an activator; and
   a resin located within the wellbore, wherein the resin is in liquid form prior to being contacted with the activator,
   wherein the first joint of liner displaces some or all of the resin in liquid form up into at least a portion of an annulus located between a wellbore wall and an outside of the liner,
   wherein contact of the activator and the resin in liquid form occurs during or after the first joint of liner displaces some or all of the resin in liquid form up into at least a portion of the annulus, and
   wherein after contact, the activator causes the resin to set via a polymerization reaction.

2. The wellbore system according to claim 1, wherein the contact occurs during displacement of the resin or after the resin has been displaced into the annulus.

3. The wellbore system according to claim 1, wherein the polymerization reaction is ring-opening metathesis polymerization, and the activator is a catalyst.

4. The wellbore system according to claim 3, wherein the resin is a cyclic olefin.

5. The wellbore system according to claim 4, wherein the cyclic olefin is selected from the group consisting of cyclobutadiene, cyclopentadiene, dicyclopentadiene, tricyclopentadiene, cyclohexadiene, cycloheptadiene, cyclooctadiene, cyclooctatetraene, dicyclopentadiene, norbornene, terpinene, isomers thereof, and combinations thereof.

6. The wellbore system according to claim 3, wherein the activator is a transition metal catalyst.

7. The wellbore system according to claim 6, wherein the transition metal catalyst is selected from the group consisting of ruthenium, osmium, molybdenum, and any combinations thereof.

8. The wellbore system according to claim 1, wherein the polymerization reaction is free-radical polymerization, and the activator is an initiator.

9. The wellbore system according to claim 8, wherein the resin is a compound containing vinyl groups.

10. The wellbore system according to claim 9, wherein the compound containing vinyl groups is selected from the group consisting of n-vinyl-imidazol, n-vinyl-caprolactam, n-vinyl-pyrrolidone, vinyl methyl oxazolidinone, n-vinyl-n-methylacetamide, ethyl vinyl ether, iso-butyl vinyl ether, cyclohexyl vinyl ether, dodecyl vinyl ether, octadecyl vinyl ether, 1,4-butanediol divinyl ether, diethyleneglycol divinyl ether, triethyleneglycol divinyl ether, 1,4-cyclohexanedimethanol divinyl ether, hydroxybutyl vinyl ether, acrylonitrile, methyl methacrylate, styrene, butadiene, propylene, vinyl ester resin, vinyl acetate, vinyl propionate, vinyl laurate, and combinations thereof.

11. The wellbore system according to claim 8, wherein the initiator is selected from organic peroxides or azo compounds.

12. The wellbore system according to claim 11, wherein the organic peroxides are selected from the group consisting of acetone peroxide, acetozone, alkenyl peroxides, arachidonic acid 5-hydroperoxide, artelinic acid, artemether, artemisinin, artemotil, arterolane, artesunate, ascaridole, benzoyl peroxide, bis(trifluoromethyl)peroxide, bis(trimethylsilyl)peroxide, tert-butyl peroxybenzoate, [3-(1-chloro-3'-methoxyspiro[adamantane-4,4'-dioxetane]-3'-yl)phenyl] dihydrogen phosphate (CSPD molecule), di-tert-butyl peroxide, diacetyl peroxide, dicumyl peroxide, diethyl ether peroxide, difluorodioxirane, dihydroartemisinin, 1,1'-Dihydroxydicyclohexyl peroxide, dilauroyl peroxide, dimesityldioxirane, dimethyldioxirane, 1,2-Dioxane, 1,2-Dioxetane, 1,2-Dioxetanedione, 1,2-Dioxolane, dipropyl peroxydicarbonate, ergosterol peroxide, hexamethylene triperoxide diamine, hydroperoxide, methyl ethyl ketone peroxide, nardosinone, paramenthane hydroperoxide, perfosfamide, peroxyacetyl nitrate, peroxyacyl nitrates, and combinations thereof.

13. The wellbore system according to claim 11, wherein the azo compounds are selected from the group consisting of 1,1'-Azobis(cyclohexanecarbonitrile), azobenzene, P-azobenzenearsonate, 1,1'-Azobis-1,2,3-triazole, 2,2'-Azobis(2-amidinopropane) dihydrochloride, 4,4'-Azobis(4-cyanopentanoic acid), azobisisobutyronitrile, azodicarbonamide, azomethane, azoxy compounds, para-azoxyanisole, azoxybenzene, balsalazide, calmagite, diethyl azodicarboxylate, diimide, diisopropyl azodicarboxylate, 4,4'-Dinitro-3,3'-diazenofuroxan, 1,3-Diphenyltriazene, fazadinium bromide, glycoazodyes, methylazoxymethanol, methylazoxymethanol acetate, phenazopyridine, 3-Phenylazoacetylacetone, potassium azodicarboxylate, and combinations thereof.

14. The wellbore system according to claim 1, wherein the polymerization reaction is step polymerization, and the activator is a second reactive monomer.

15. The wellbore system according to claim 14, wherein the resin is an epoxy resin, and wherein the epoxy resin comprises a diglycidyl ether functionalized molecule or a multifunctional glycidyl ether molecule.

16. The wellbore system according to claim 15, wherein the diglycidyl ether functionalized molecule is selected from the group consisting of a diglycidyl ether of bisphenol A, cyclohexane dimethanol diglycidyl ether, and combinations thereof.

17. The wellbore system according to claim 14, wherein the second reactive monomer is selected from the group consisting of amines, acids, acid anhydrides, phenols, alcohols, thiols, aliphatic amines, aliphatic tertiary amines, aromatic amines, cycloaliphatic amines, heterocyclic amines, amido amines, polyamides, polyethyl amines, polyether amines, polyoxyalkylene amines, diethyltoluene diamine, carboxylic anhydrides, carboxylic acids, triethylenetetraamine, ethylene diamine, N-cocoalkyltrimethylene, isophorone diamine, N-aminophenyl pipera-zine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof.

18. The wellbore system according to claim 1, wherein a ratio of activator to resin is in a range of 1:1 to 1:1,000.

19. The wellbore system according to claim 1, wherein the activator is in a solid form, and wherein the activator is coated onto an outside of the liner.

20. The wellbore system according to claim 1, wherein the activator is in liquid form, and wherein the activator is physically separated from contacting the resin until after the resin has been displaced into the annulus.

* * * * *